(12) United States Patent
Christensen et al.

(10) Patent No.: US 11,345,350 B2
(45) Date of Patent: May 31, 2022

(54) METHODS AND SYSTEM FOR SELECTING A CALIBRATION FOR A VEHICLE

(71) Applicant: Ford Global Technologies, LLC, Dearborn, MI (US)

(72) Inventors: Michael Scott Christensen, Canton, MI (US); John Eric Rollinger, Troy, MI (US); Adam Joseph Krach, Canton, MI (US); Nicholas Herhusky, Dearborn, MI (US); Michael Bastanipour, Ferndale, MI (US); Scott Steadmon Thompson, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 16/779,969

(22) Filed: Feb. 3, 2020

(65) Prior Publication Data

US 2021/0237731 A1 Aug. 5, 2021

(51) Int. Cl.

| | | |
|---|---|---|
| *B60W 30/182* | (2020.01) | |
| *F02D 41/40* | (2006.01) | |
| *F02P 5/15* | (2006.01) | |
| *F16H 59/60* | (2006.01) | |
| *B60W 20/00* | (2016.01) | |
| *F02D 41/00* | (2006.01) | |
| *F02D 41/38* | (2006.01) | |

(52) U.S. Cl.
CPC .......... *B60W 30/182* (2013.01); *B60W 20/00* (2013.01); *F02D 41/0007* (2013.01); *F02D 41/401* (2013.01); *F02P 5/1502* (2013.01); *F16H 59/60* (2013.01); *F02D 2041/389* (2013.01); *F02D 2200/701* (2013.01)

(58) Field of Classification Search
CPC .... B60W 30/182; B60W 50/06; B60W 20/00; F02D 41/401; F02D 41/0007; F02D 41/2487; F02P 5/1502; F16H 59/60; G05D 2201/0213; G05D 1/0291

See application file for complete search history.

(56) References Cited

U.S. PATENT DOCUMENTS

| | | | | |
|---|---|---|---|---|
| 7,853,395 | B2 * | 12/2010 | Guo | F02D 41/2422 |
| | | | | 701/102 |
| 2010/0305819 | A1 * | 12/2010 | Pihlajamaki | B60W 50/14 |
| | | | | 701/51 |
| 2015/0224997 | A1 * | 8/2015 | Glugla | F02D 41/266 |
| | | | | 701/54 |

OTHER PUBLICATIONS

"Huffman coding," Wikipedia Website, Available Online at https://en.wikipedia.org/wiki/Huffman_coding, Available as Early as Oct. 30, 2001, 10 pages.

(Continued)

*Primary Examiner* — George C Jin
(74) *Attorney, Agent, or Firm* — Geoffrey Brumbaugh; McCoy Russell LLP

(57) ABSTRACT

Systems and methods for operating a vehicle that may be driven to or sold in different geographical locations that may have different engine emissions and fuel economy standards are described. The systems and methods may adjust vehicle operation to comply with standards that may be enforced where the vehicle is geographically located. The standards may apply to countries, treaty zones, race track areas, off-road areas, and other geographically related standards.

20 Claims, 4 Drawing Sheets

(56) References Cited

OTHER PUBLICATIONS

"Text Compression with Huffman Coding," YouTube Website, Available Online at https://www.youtube.com/watch?v=iiGZ947Tcck, Aug. 21, 2015, 3 pages.

Christensen, M. et al., "Methods ans System for Storing and Activating a Calibration for a Vehicle," U.S. Appl. No. 16/779,979, filed Feb. 3, 2020, 45 pages.

* cited by examiner

FIG. 3

Grid 300:

| 301a | 301b | 302l | 302o | 301f | 301s | 302v | 305e |
|------|------|------|------|------|------|------|------|
| 302a | 302g | 302m | 302p | 302r | 303i | 305b | 304g |
| 302b | 302h | 302n | 302q | 302s | 303j | 304e | 302w |
| 302c | 302i | 301c | 305b | 302t | 304a | 304f | 302x |
| 303a | 303b | 301d | 305c | 303h | 304b | 305c | 303k |
| 302d | 302j | 303d | 303f | 302u | 304c | 305d | 304h |
| 302e | 303c | 303e | 303g | 301g | 304d | 301t | 305f |
| 302f | 302k | 305a | 301e | 301r | 305a | 301u | 302y |

Table 302a (with 312, 310, 314, 311, 313, 315):

| x/y | 750 | 1000 | 2000 | 2500 | 3000 | 5000 |
|-----|-----|------|------|------|------|------|
| 0.11 | 0.3 | 0.34 | 0.4 | 0.48 | 0.4 | 0.5 |
| 0.2 | 0.33 | 0.34 | 0.4 | 0.4 | 0.45 | 0.55 |
| 0.4 | 0.45 | 0.43 | 0.35 | 0.42 | 0.47 | 0.55 |
| 0.6 | 0.57 | 0.53 | 0.45 | 0.5 | 0.55 | 0.55 |
| 1.2 | 0.57 | 0.53 | 0.43 | 0.44 | 0.46 | 0.55 |
| 1.5 | 0.77 | 0.57 | 0.4 | 0.4 | 0.42 | 0.55 |

320 (321 ... 322):

| 0.32 | 0.35 | 0.42 | 0.48 | 0.42 | 0.5 |

340 (341 ... 342):

| 0.47 | 0.43 | 0.36 | 0.4 | 0.48 | 0.55 |
| 0.6 | 0.53 | 0.47 | 0.52 | 0.54 | 0.58 |

360 (361 ... 362):

| 0.75 | 0.55 | 0.42 | 0.43 | 0.47 | 0.53 |

Table 380 (372, 376, 374, 378):

| x/y | 750 | 1000 | 2000 | 2500 | 3000 | 5000 |
|-----|-----|------|------|------|------|------|
| 0.11 | 0.3 | 0.34 | 0.4 | 0.48 | 0.4 | 0.5 |
| 0.2 | 0.33 | 0.34 | 0.4 | 0.4 | 0.45 | 0.55 |
| 0.4 | 0.47 | 0.43 | 0.36 | 0.4 | 0.48 | 0.55 |
| 0.6 | 0.6 | 0.53 | 0.47 | 0.52 | 0.54 | 0.58 |
| 1.2 | 0.57 | 0.53 | 0.43 | 0.44 | 0.46 | 0.55 |
| 1.5 | 0.77 | 0.57 | 0.4 | 0.4 | 0.42 | 0.55 |

METHODS AND SYSTEM FOR SELECTING A CALIBRATION FOR A VEHICLE

FIELD

The present description relates to methods and a system for adjusting calibration parameters of a vehicle. The calibration parameters may allow vehicle operation to be adjusted for the vehicle's geographical location and regulations that are in force at the vehicle's geographical location.

BACKGROUND AND SUMMARY

A vehicle may include a controller that includes a calibration. The calibration may be a collection of control parameters including integer numbers, logical values, and floating point numbers that may be the basis for adjusting vehicle actuators and estimating vehicle control parameters from sensor inputs. In particular, a control strategy within the controller may determine vehicle conditions from sensors using some of the control parameters in the calibration and the control strategy may adjust actuators based on the vehicle conditions and other control parameters in the calibration. The controller is programmed with a single calibration before the exits a manufacturing plant. The single calibration may be based on where the vehicle is to be sold so that emissions, fuel economy, and vehicle performance comply with regulations in the area that the vehicle is sold. However, the vehicle may be driven to and remain in a location that has different regulations than the location where the vehicle was sold. As such, the vehicle may not comply with regulations at its new location. Nevertheless, it may be desirable to bring the vehicle into regulatory compliance via installing a new calibration. However, the vehicle's owner may not have time to bring the vehicle in for service to change the calibration, and the vehicle's owner may become frustrated if the vehicle is unavailable while a new calibration is being downloaded to the controller. In addition, the controller may not have memory capacity to store more than one calibration since one calibration may include hundreds or even thousands of control parameters. Therefore, it may be desirable to provide a way of loading alternative calibrations into a vehicle without having to service the vehicle.

The inventors herein have recognized the above-mentioned issues and have developed an operating method for a vehicle, comprising: receiving data via one or more satellites; estimating a position of a vehicle in response to the data; loading a group of vehicle calibration parameters that are based on the position of the vehicle into controller memory; and adjusting one or more actuators responsive to the vehicle calibration parameters.

By loading vehicle calibration parameters into controller memory that are based on a position of a vehicle, it may be possible to provide the technical result of meeting emissions and fuel economy standards that are geographically influenced. For example, a single vehicle may include calibration parameters for a plurality of vehicle calibrations so that no matter where the vehicle is sold or driven, the vehicle may comply with local emissions and fuel economy regulations. In addition, the total number of calibration parameters stored in controller memory of the vehicle may be reduced via storing only subsets of calibration parameters for vehicle calibrations other than a baseline vehicle calibration. Calibrations other than the base calibration (e.g., compact calibrations) may be created via combining parameters of calibrations other than the base calibration with parameters of the baseline calibration. Consequently, memory within the controller may be reduced, thereby reducing cost of memory and increasing a total number of calibrations that may be stored within the controller.

The present description may provide several advantages. For example, the approach may reduce a total amount of memory used to store a plurality of vehicle calibrations. In addition, the vehicle calibrations may be changed automatically without input from a vehicle manufacturer or from the vehicle's owner. Further, the approach may provide for quicker vehicle calibration changes since fewer calibration parameters may be loaded to controller memory when changing calibrations.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 3 shows example calibration tables; and

DETAILED DESCRIPTION

Figure 4:
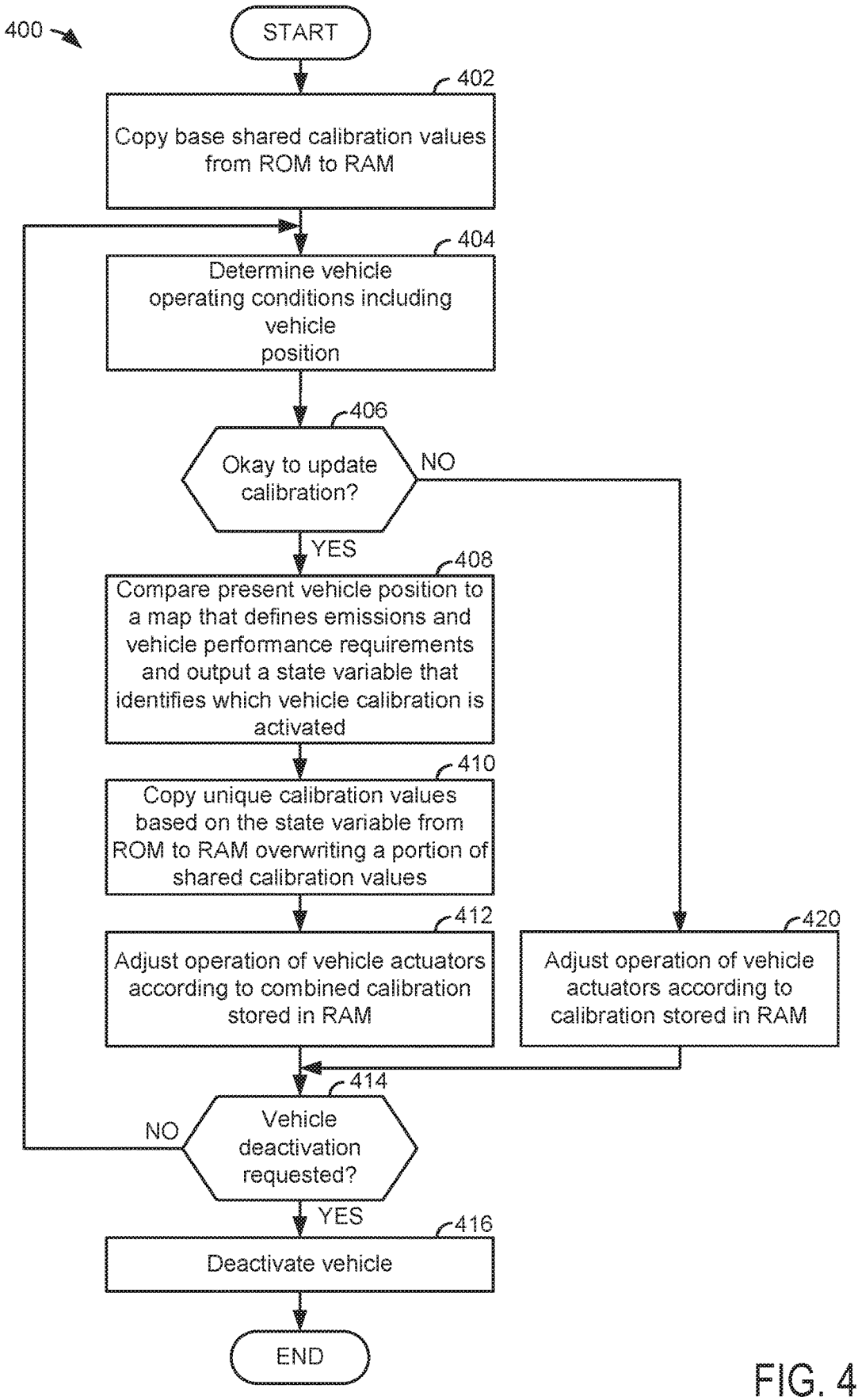
FIG. 4 shows a method for operating a vehicle with a plurality of different calibrations.

The present description is related to installing one of a plurality of vehicle calibrations into a single vehicle. The vehicle calibrations may affect a way a vehicle operates. The vehicle calibrations may affect vehicle emissions, fuel economy, and/or performance. The vehicle calibrations may be loaded into controller memory and may be made operational when a vehicle changes geographical locations. Geographical locations may include but are not limited to international borders, state borders, provincial borders, and private property borders (e.g., race tracks, off-road areas, etc.). The vehicle calibrations may include control parameters for engines of the type shown in FIG. 1. The vehicle calibrations may also include control parameters for transmissions and electric machines included in a driveline as shown in FIG. 2. The vehicle calibrations may include Boolean values and/or numeric values that are part of a function or table as shown in FIG. 3. A method for reducing an amount of memory applied to operate a vehicle is shown in FIG. 4.

Figure 1:
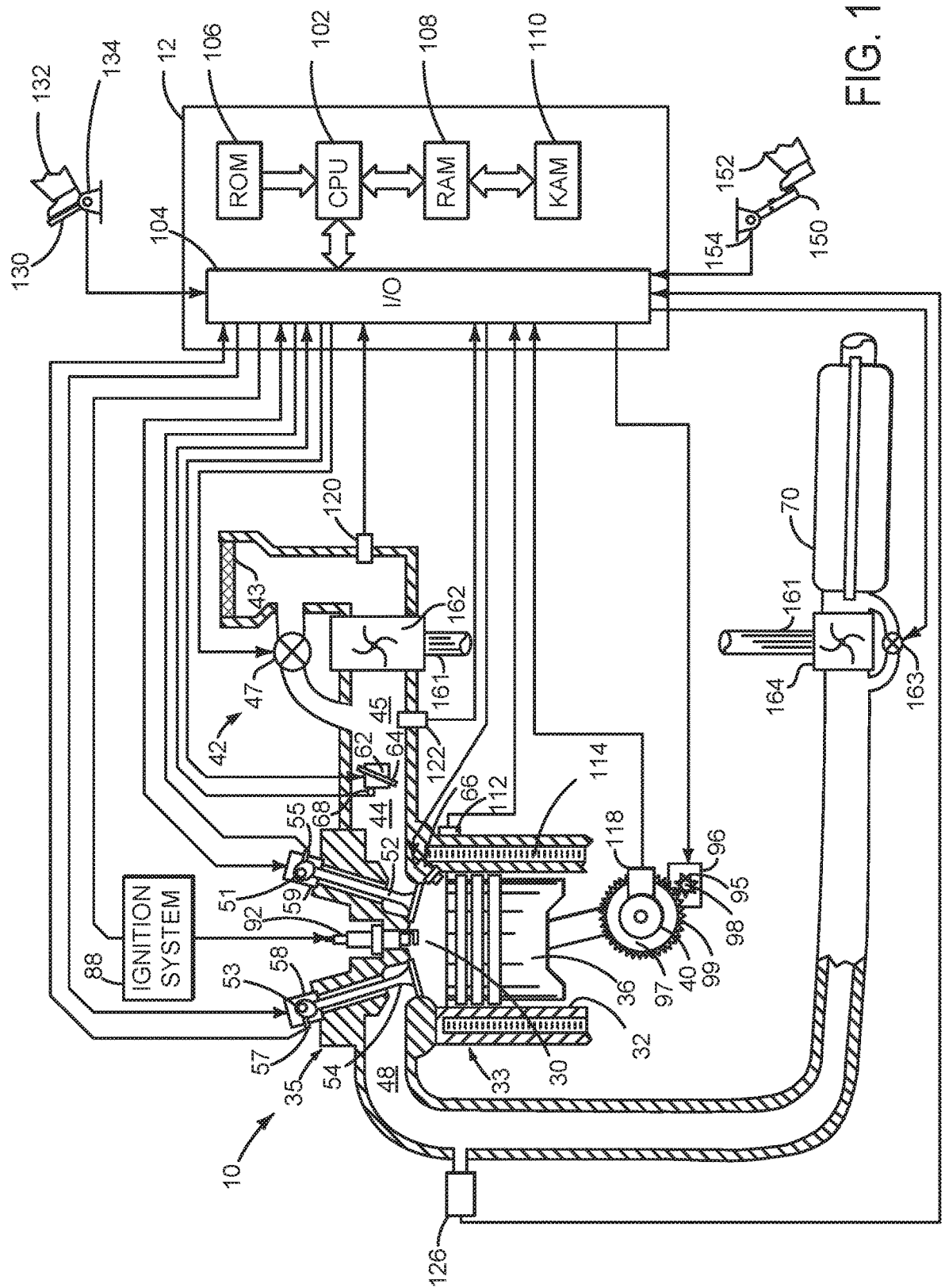
FIG. 1 is a schematic diagram of an engine.
Figure 2:
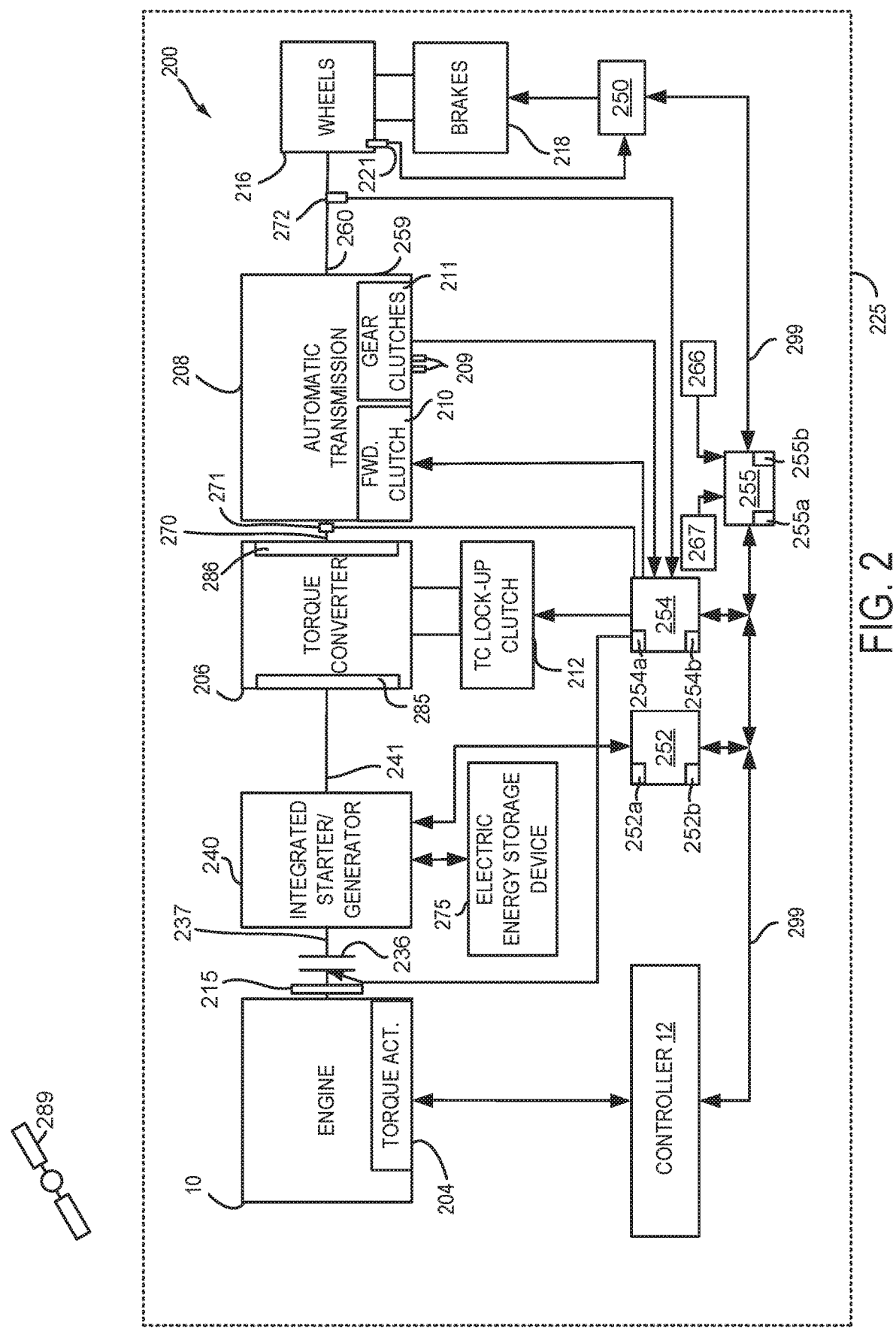
FIG. 2 is a schematic diagram of a hybrid vehicle powertrain.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12, and the pulse width may be determined via calibration values that are stored in a table or function in the memory of engine controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory or ROM), random access memory 108 (RAM), keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 152; a position sensor 154 coupled to brake pedal 150 for sensing force applied by human driver 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 may include a plurality of calibrations stored within controller memory that cause the controller 12 to operate the engine in a desired way such that engine 10 meets legislative emissions, drivability constraints, legislative fuel economy mandates, and engine performance metrics. A first calibration may cause controller 12 to operate the engine according to legislative emissions, drivability constraints, legislative fuel economy mandates, and engine performance metrics of a first country (e.g., Canada). A second calibration, different from the first calibration, may cause controller 12 to operate the engine according to legislative emission, drivability constraints, legislative fuel economy mandates, and engine performance metrics of a second country (e.g., United States of America). Similarly, controller 12 may include unique calibrations for different states, providences, or other governmental districts. Controller 12 may also include unique calibrations for off-road areas, race tracks, and other privately held areas. may adjust the pressure in boost chamber 45 according to a calibration that includes tables and/or functions for determining boost pressure. For example, calibration tables may provide boost pressures that are a function of engine speed and driver demand torque.

FIG. 2 is a block diagram of a vehicle 225 including a powertrain 200. The powertrain of FIG. 2 includes engine 10 shown in FIG. 1. Powertrain 200 is shown including vehicle system controller 255, engine controller 12, electric machine controller 252, transmission controller 254, and brake controller 250. Vehicle system controller 255 includes RAM 255a and ROM 255b. Electric machine controller includes RAM 252a and ROM 252b. Transmission controller 254 includes RAM 254a and ROM 254b. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque to provide a desired rate of vehicle deceleration. The desired wheel torque may be provided by vehicle system controller requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Vehicle system controller 255 may communicate with human/machine interface 267. Human/machine interface may be a touch screen display, key board and display, or other known type of human/machine interface. Global positioning satellite 289 sends position information and timing information to global positioning receiver 266. Global positioning receiver 266 estimates a geographical position of vehicle 225 based on the position information and timing information provided by global positioning satellite 289 and other global positioning satellites (not shown).

In this example, powertrain 200 may be powered by engine 10 and electric machine 240. In other examples, engine 10 may be omitted. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of powertrain disconnect clutch 236 through dual mass flywheel 215. Disconnect clutch 236 may be electrically or hydraulically actuated. The downstream side of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the IS G 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271. Transmission controller 254 may receive transmission output shaft torque from torque sensor 272. Alternatively, sensor 272 may be a position sensor or torque and position sensors. If sensor 272 is a position sensor, controller 254 differentiates a position signal to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Each of controller 12, electric machine controller 252, transmission controller 254, and vehicle system controller 255 may include a plurality of individual calibrations that are stored in their respective ROM as described in more detail in FIG. 3. For example, engine controller 12 may contain a base calibration, a calibration for a first country, a calibration for a second country, a calibration for a first state or providence, a calibration for a second state or providence, and so on. Further, engine controller 12 may also contain a calibration for off-road conditions and a calibration for race track operation. Likewise, electric machine 252, transmission controller 254, and vehicle system controller 255 may also contain base calibrations and individual calibrations for the previously mentioned geographical areas described with regard to the engine controller.

Thus, the system of FIGS. 1 and 2 provides for a system, comprising: an engine; a motor/generator; a transmission mechanically coupled to the engine and the motor/generator; and a controller including executable instructions stored in non-transitory memory that cause the controller to load baseline calibration parameters into controller memory locations and overwrite a portion of the baseline calibration parameters loaded into the controller memory locations with calibration parameters that are a function of a vehicle's geographical location. The system further comprises additional instructions to retrieve the calibration parameters that are a function of the vehicle's geographical location from read-only memory of the controller. The system includes where the baseline calibration parameters are loaded into read-only memory in the controller. The system includes where loading the baseline calibration parameters into controller memory includes writing values of a table into the controller memory locations. The system includes where loading the baseline calibration parameters into the controller memory includes writing values of a function into the controller memory locations. The system further comprises additional instructions that cause the controller to adjust an actuator of the engine in response to the calibration parameters that are the function of the vehicle's geographical location. The system further comprises additional instructions that cause the controller to adjust an actuator of the transmission in response to the calibration parameters that are the function of the vehicle's geographical location.

Referring now to FIG. 3, a description of an example calibration for an engine controller is shown. FIG. 3 also shows an example of a table that may be stored in a base calibration, and FIG. 3 also shows how a base calibration may be combined with a compact calibration that is a fraction of the size of the base calibration to generate a new calibration.

An example base calibration 300 is shown; however, the dimensions of base calibrations stored within a controller may be larger or smaller than example base calibration 300. Base calibration 300 includes tables 302a-y of varying dimensions, functions 303a-k of varying dimensions, individual scalars in the form of real numbers 301a-t, logical variables 304a-h, and break point values 305a-f. The base calibration 300 may be stored in ROM when the vehicle is manufactured and each controller may have a unique base calibration that forms a basis for determining values of control variables from sensor inputs and for determining values of control variables for adjusting actuator outputs. Entries in the tables, functions, scalars, logical variables, and beak point values may be referred to as control parameters.

An example table 302a from calibration 300 is shown below calibration 300. In this example, table 302a has dimensions of 6 rows of cells by 6 columns of cells, or 6×6 36 elements in 36 cells make up table 302a. However, it should be noted that calibration 300 may include many tables 302 having different dimensions. For example, a first table 302a may be a 4×4 table and a second table 302b may be a 6×8 table, the first table and the second table may be included in the calibration 300.

In this example, table 302a is shown with column break points 310 and row brake points 311. The column and row break points 310 and 311 make up break points 305 and they may be stored at ROM locations that are apart from ROM locations where values in table 302a are stored. The column break points in this example begin with a value of 750 and increase to an upper value of 5000. In this example, the column break points represent engine speed values for interpolating values between the cells of table 302a, but they may represent other values as well (e.g., electric machine current) in other tables. The row break points begin with a value of 0.11 and increase to a value of 1.5. In this example, row break points represent engine load values for interpolating vales between the cells of table 302a, but they may represent other values as well (e.g., transmission fluid temperature) in other tables.

The table cell entry [1,1] of table 302a is indicated at 312 and it contains a floating point real number having a value of 0.3. Table cell entry [6,1] is indicated at 313 and it contains a floating point real number having a value of 0.77. The table cell entry [1,6] of table 302a is indicated at 314 and it contains a floating point real number having a value of 0.5. Table cell entry [6,6] is indicated at 315 and it contains a floating point real number having a value of 0.55. Thus, a base calibration may include a plurality of tables and the plurality of tables may include a plurality of floating point real numbers. Functions may be stored in a similar way as tables, but functions may be limited to one column by N rows or one row by N columns, where N is a positive integer number. Each base table may be assigned a unique name by which it may be referenced. For example, base table 302a may be named EGRvB to indicate that it may describe base requested exhaust gas recirculation (EGR) valve positions, and individual cells in the table may be referenced as described in further detail in the method of FIG. 4. A base table 302b for engine spark may be named SPK_B, and so on for other base tables 302.

A sub-table 320 for an alternative compact calibration is shown directly below table 302a. Sub-table 320 may be included in a compact second calibration that is stored in ROM similar to calibration 300, and a sub-table is associated with a table (e.g., 320a) in the base calibration. A sub-table 320 includes a fraction of cells and control parameters of a base table that the sub-table is associated with. Thus, a sub-table of table 302a may be stored in fewer memory locations than table 302a.

A sub-table may be associated with and combined with a base table so that the base calibration may be revised to provide a second unique calibration. For example, sub-table 320 may be included in a second calibration and sub-table 320 may be associated with table 302a of the base calibration. Sub-table 340 may be included in a third calibration and it may also be associated with table 302a of the base calibration. Similarly, sub-table 360 may be included in a fourth calibration and it may also be associated with table 302a of the base calibration. Sub-table 320 is a 1×6 table that may be associated with cells [2,1]-[2,6] of table 302a. The table cell entry [1,1] of table 320 is indicated at 321 and table cell entry [1,6] of table 320 is indicated at 322. Sub-table 340 is a 2×6 table that may be associated with cells [3,1]-[3,6] and [4,1]-[4,6] of table 302a. The table cell entry [1,1] of table 340 is indicated at 341 and table cell entry [2,6] of table 340 is indicated at 342. Sub-table 360 is a 1×6 table that may be associated with cells [6,1]-[6,6] of table 302a. The table cell entry [1,1] of table 360 is indicated at 361 and table cell entry [1,6] of table 360 is indicated at 362. The individual calibrations may include pointers that direct which memory locations of the base table that the sub-tables are to be copied to when calibrations other than the base calibration are loaded into controller RAM.

Table 380 is a table of the third calibration that is generated via combining table 340 of the compact third calibration and table 302a (the base table from the baseline calibration). In particular, to load the third calibration to RAM, table 302a is copied from the baseline calibration stored in ROM to RAM. Then, table 340 from the third calibration is copied from ROM into locations of table 302a that have been copied into RAM to yield a new table 380 that is part of the third calibration. Specifically, table cell entries [1,1]-[1,6] and [2,1]-[2,6] of table 340 are copied to table cell entries [3,1]-[3,6] and [4,1]-[4,6] of table 302*a* stored in RAM to generate table 380 in place of table 302*a*. Table 380 occupies the same memory locations in RAM as did table 302*a*. Table cell entry [1,1] of table 380 is indicated at 372. Table cell entry [6,1] is indicated at 374. Table cell entry [6,1] is indicated at 376. Table cell entry [6,6] is indicated at 378. Thus, a complete third calibration is built from the baseline calibration and the compact third calibration.

All tables, functions, logical variables, break points, and individual scalars that are included in the base calibration may be revised via compact calibrations that may be substantially smaller than the base calibration to generate new alternative calibrations (e.g., calibrations 1-N where N is an integer number). In particular, a base calibration may be copied from ROM to RAM. Then, sub-portions of tables, functions, logical variables, break points, and individual scalars may overwrite some of the baseline calibration parameters that are stored in RAM to generate a new calibration that is different from the baseline calibration. The new calibration may cause a controller to provide emissions, fuel economy, and performance according to regulations in the vehicle's present geographical area.

Referring now to FIG. 4, a method for operating a vehicle powertrain is shown. At least portions of method 400 may be implemented as executable controller instructions stored in non-transitory memory. Additionally, portions of method 400 may be actions taken in the physical world to transform an operating state of an actuator or device.

At 402, method 400 copies a base shared vehicle calibration from controller ROM to controller RAM. The controller may be an engine controller 12, transmission controller 254, electric machine controller 252, or vehicle system controller 255. The calibration values are copied from controller ROM to controller RAM so that control parameters in the calibration may be access at a higher speed and possibly modified to make a calibration other than the base calibration. For example, vehicle control parameters located in ROM locations 100-5000 (decimal) may be loaded into RAM locations 3100-8000 (decimal). The entire base calibration is copied from RAM to ROM. The base calibration may include but is not limited to tables, functions, break points, scalars, and logical values. In one example, the base calibration may be a calibration that causes the controller to adjust powertrain operation to meet regulations of a particular geographical region (e.g., United States of America or Canada). Method 400 proceeds to 404 after the base shared calibration.

At 404, method 400 determines the vehicle's present operating conditions including the vehicle's present position. Method 400 may determine the vehicle's present position via a global positioning system receiver 266 as shown in FIG. 2 and geographical maps that are stored in memory of controller 12 of FIG. 2. Further, method 400 may determine conditions of the vehicle including vehicle speed, engine speed, and driver demand torque via the various sensors described herein. Method 400 proceeds to 406.

At 406, method 400 judges if vehicle operating conditions are desirable to update the base calibration to a calibration that is based on the vehicle's present geographical location and regulations at the present geographical location. In one example, method 400 may require that the vehicle is stopped and parked to update the base calibration to a different calibration. In other examples, method 400 may require other vehicle operating conditions be present for updating the base calibration from being the active calibration to an alternative calibration as being the active calibration. An active calibration is a calibration that is the basis for converting information from sensors into control parameters and adjusting powertrain actuators to operate the vehicle. For example, method 400 may require that the vehicle change from a first geographical area to a second geographical area to proceed to 408, the first geographical area having different vehicle regulations than the second geographical area. If method 400 judges that conditions are present for revising the base calibration, the answer is yes and method 400 proceeds to 406. Otherwise, the answer is no and method 400 proceeds to 420.

At 408, method 400 compares the vehicle's present position with a map that identifies names of calibration state variables that indicate which calibration is to be loaded into controller memory and is a basis for operating the vehicle. For example, the geographical area of Mexico may be assigned a calibration state variable CAL1, Canada may be assigned a calibration state variable CAL2, European Union member countries may be assigned a calibration state variable CAL3, race track or other off-road locations that may not be subject to on-road regulations may be assigned a state variable CAL4, and so on. The calibration state variables identify which compact calibration is to be combined with the vehicle's base calibration so that the vehicle meets the regulations for the present geographical location of the vehicle. Further, tables, functions, logical variables, break points, and individual scalars are individually identified and they may be assigned with the state variable so that they may be copied over base values stored in RAM. For example, a base table that identifies an engine spark advance timing as a function of driver demand torque and engine speed may be identified as SPK_B. A sub-table included within a compact calibration that is associated with the base table SPK_B may be identified as SPK_B_CAL1, for example. In this example, the sub-table name SPK_B_CAL1 is generated via combining the name SPK_B from the table name in the base calibration with the name of the compact calibration CAL1. The row, column, and insertion location where the sub-table is copied into the base table SPK_B may be stored within the compact calibration. Method 400 proceeds to 410 after determining the compact calibration that is to be combined with the base calibration. If method 400 judges that the vehicle is in a geographical location that is associated with the base calibration, method 400 may skip to 414.

At 410, method 400 copies unique calibration parameters to locations in RAM being occupied by base calibration parameters or calibration parameters from a different compact calibration. Method 400 copies each calibration parameter including but not limited to tables, functions, logical variables, break points, and individual scalars to RAM over writing portions of the base calibration or a different compact calibration. An example routine for copying a base table from ROM to RAM and updating the table in RAM according to the compact calibration CAL1, thereby generating a calibration that is distinct from the base calibration is as follows:

Line 1:/* constant definitions for table sizes */
Line 2: #define NUM_ROWS 6
Line 3: #define NUM_COLS 6

```
Line 4:  #define NUM_REPLACEMENT_COLS 5
Line 5:  #define REPLACEMENT_ROW 4
Line 6:  #define START_IDX 0
Line 7:  typedef struct _ BASE_TABLE {
Line 8:      unsigned char rows;
Line 9:      unsigned char cols;
Line 10:     float (*data_arr)[NUM_COLS];
Line 11: } BASE_TABLE;
Line 12: typedef struct _COMBINED_TABLE {
Line 13:     unsigned char row;
Line 14:     unsigned char cols;
Line 15:     unsigned char start_idx;
Line 16:     float * data_arr;
Line 17:         COMBINED_TABLE_BASE * base_table;
Line 18: } COMBINED_TABLE;
Line 19:     float SPK_B[NUM_ROWS][NUM_COLS] = {
Line 20:         { 30.0f, 32.0f, 33.0f, 35.0f, 38.0f, 40.0f },
Line 21:         { 30.0f, 31.0f, 32.0f, 33.0f, 35.0f, 40.0f },
Line 22:         { 25.0f, 27.0f, 28.0f, 28.0f, 30.0f, 32.0f },
Line 23:         { 20.0f, 22.0f, 23.0f, 25.0f, 26.0f, 26.0f },
Line 24:         { 15.0f, 18.0, 20.0f, 22.0f, 22.0f, 22.0f },
Line 25:         { 5.0f, 8.0f, 10.0f, 15.0f, 15.0f, 15.0f }
Line 26:     };
Line 27:     float SPK_B_CAL1[NUM_REPLACEMENT_COLS] = { 10.0f, 12.0f, 18.0f,
Line 28: 20.0f, 20.0f };
Line 29:     TABLE_BASE SPK_FNL_BASE = {
Line 30:         NUM_ROWS,        /* number of rows of complete table */
Line 31:         NUM_COLS,        /* number of cols of complete table */
Line 32:         &SPK_B[0]  /* array of base cal data */
Line 33:     };
Line 34:     COMBINED_TABLE SPK_FNL = {
Line 35:         REPLACEMENT_ROW,          /* insert into the 5th row (indexed by 0) */
Line 36:         NUM_REPLACEMENT_COLS,     /* insert 5 columns */
Line 37:         START_IDX,       /* starting at the 0th idx of the rowth row */
Line 38:         SPK_B_CAL1,      /* data to insert */
Line 39:         &SPK_FNL_BASE             /* address of the base table struct */
Line 40:     };
```

At lines 1-6, the value of variable NUM_ROWS is defined as 6. Similarly, numeric values are assigned to the other variables. At lines 7-11 a structure BASE_TABLE is defined including its members (e.g., rows). At lines 12-18 a structure COMBINED_TABLE is defined including its members. At lines 19-26, the base spark calibration table is defined in ROM as SPK_B and it is a basis for operating the engine in this example. The values (e.g., 30.0f) in the brackets { } are floating point number entries in the table SPK_B. The revisions to table SPK_B that are part of CAL1 are defined in ROM as SPK_B_CAL1 at lines 27 and 28. The base spark timing is copied into RAM at lines 29-33 and it is named SPK_FNL_BASE. This table that is actually the basis for engine spark timing when the base calibration is activated. The base table stored in RAM SPK_FNL is modified at lines 34-40 where values in SPK_B_CAL1 are copied into SPK_FNL_BASE. The table SPK_FNL_BASE is the basis for determining engine spark timing according to calibration number one (e.g., CAL1). Other variables, parameters, tables, functions, scalars, and logical variables may be updated in the base calibration to from the calibration CAL1 The updated calibration is activated after copying the compact calibration parameters into memory that is occupied by the base calibration or another compact calibration. Method 400 proceeds to 412.

At 412, the updated calibration is activated and it becomes the basis for operating the engine. For example, engine spark timing may be adjusted according to new entries in a base spark table that now is a different calibration. Further, fuel injection, throttle control, cam control, exhaust gas recirculation (EGR), etc. may be provided in accordance with the newly revised calibration that is presently activated. Method 400 proceeds to 414.

At 414, method 400 judges if vehicle and engine deactivation is requested. Vehicle and/or engine deactivation may be requested via input to a human/machine interface. If method 400 judges that vehicle or engine deactivation is requested, the answer is yes and method 400 proceeds to 416. Otherwise, method 400 returns to 404.

At 416, method 400 deactivates the vehicle. The vehicle may be deactivated via ceasing to supply fuel to the engine. In other examples, the vehicle may be deactivated via ceasing to supply electrical current to an electric machine. Method 400 exits.

At 420, method 400 adjusts vehicle operation according to the presently activated calibration. The presently activated calibration may be a base calibration or a base calibration that has been modified by writing parameter values from a compact calibration over base calibration parameter values. The base calibration and compact calibrations may be calibrations for internal combustion engines, transmissions, electric machines, and other devices on-board a vehicle. Adjusting vehicle operation may include adjusting engine control parameters, engine actuators (e.g., fuel injectors, ignition systems, EGR valves, etc.), electric machines (e.g., inverter operation, motor/generator operation, etc.), transmissions (e.g., clutch control solenoids, speed sensor data, etc.), and/or adjusting values of control parameters that may be determined from vehicle sensors. Method 400 proceeds to 414.

In this way, a base calibration that is the basis for controlling actuators of a vehicle and determining control parameters from sensor output may be revised without having to replace the entire base calibration, thereby reducing controller memory. Further, vehicle calibrations may be revised as a function of a vehicle's geographical location so that a vehicle may be in compliance with local regulations.

Thus, the method of FIG. 4 provides for an operating method for a vehicle, comprising: receiving data via one or more satellites; estimating a position of a vehicle in response to the data; loading a group of vehicle calibration parameters that are based on the position of the vehicle into controller memory; and adjusting one or more actuators responsive to the vehicle calibration parameters. The method includes where the group of vehicle calibration parameters is selected from a plurality of groups of vehicle calibration parameters. The method includes where the loading a group of vehicle calibration parameters includes writing a first group of vehicle calibration parameters to random access memory locations and overwriting a portion of the random access memory locations via writing a second group of vehicle calibration parameters to the portion of the random access memory. The method includes where the data includes time and position information. The method includes where the one or more actuators include engine actuators. The method includes where the one or more actuators include transmission actuators. The method includes where the one or more actuators includes an inverter coupled to an electric machine.

The method of FIG. 4 also provides for an operating method for a vehicle, comprising: loading a first group of vehicle calibration parameters that are based on a geographical position of a vehicle into controller memory locations; overwriting a portion of the controller memory locations with a second group of vehicle calibration parameters in response to the geographical position of the vehicle changing, and where the second group of vehicle calibration parameters includes fewer vehicle calibration parameters than the first group of vehicle calibration parameters; and adjusting one or more actuators responsive to the vehicle calibration parameters. The method includes where loading the first group of vehicle calibration parameters includes reading the first group of vehicle calibration parameters from read-only memory and writing the first group of vehicle control parameters to random-access memory. The method includes where overwriting the portion of controller memory locations includes overwriting random-access memory locations. The method includes where the geographical position is determined via a global positioning system. The method further comprises additional instructions to select a state variable that represents a vehicle calibration to be activated based on the geographical position of the vehicle. The method includes where the vehicle calibration parameters adjust emissions of an engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, hybrid electric vehicles including engines operating in natural gas, gasoline, diesel, or alternative fuel configurations could use the present description to advantage.

The invention claimed is:

1. An operating method for a vehicle, comprising:
   storing a plurality of vehicle calibrations to read-only memory of a controller;
   estimating a position of a vehicle in response to the data;
   loading a base calibration from the plurality of vehicle calibrations into random-access memory of the controller, and generating a revised calibration via copying parameters from an alternate calibration included in the plurality of vehicle calibrations into random access memory of the controller based on the position of the vehicle; and
   adjusting one or more actuators responsive to the vehicle calibration parameters.

2. The method of claim 1, where the plurality of calibrations includes different size calibrations.

3. The method of claim 1, where the controller is a transmission controller.

4. The method of claim 1, where the position of the vehicle is determined via time and position information.

5. The method of claim 1, where the one or more actuators include engine actuators.

6. The method of claim 1, where the one or more actuators include transmission actuators.

7. The method of claim 1, where the one or more actuators includes an inverter coupled to an electric machine.

8. A system, comprising:
   an engine;
   a motor/generator;
   a transmission mechanically coupled to the engine and the motor/generator; and
   a controller including executable instructions stored in non-transitory memory that cause the controller to copy a baseline calibration from read-only memory to random access memory, copy an alternative calibration from the read-only memory to the random access memory and overwrite portions of the baseline calibration copied into random access memory, the baseline calibration and the alternative calibration included in a plurality of calibrations stored in the read-only memory, the alternative calibration selected according to a vehicle's geographical location.

9. The system of claim 8, where the controller is a transmission controller.

10. The system of claim 8, where the controller is a transmission controller.

11. The system of claim 8, where the controller is an engine controller.

12. The system of claim 8, where the baseline calibration includes one or more functions.

13. The system of claim 8, further comprising additional instructions that cause the controller to adjust an actuator of the engine in response to the alternative calibration.

14. The system of claim 8, further comprising additional instructions that cause the controller to adjust an actuator of the transmission in response to the alternative calibration.

15. An operating method for a vehicle, comprising:
storing a plurality of different calibrations, including different size calibrations, in read-only memory of a controller;
loading a base calibration from the read-only memory to random-access memory of the controller;
overwriting a portion of the random-access memory that includes the base calibration with an alternative calibration that is copied from the read-only memory, the alternative calibration selected in response to a geographical position of the vehicle changing, and where the alternative calibration includes fewer vehicle calibration parameters than the base calibration; and
adjusting one or more actuators responsive to calibration parameters stored in the random-access memory.

16. The method of claim 15, where the controller is an engine controller.

17. The method of claim 15, where the controller is a transmission controller.

18. The method of claim 15, where the geographical position is determined via a global positioning system.

19. The method of claim 15, further comprising selecting a state variable that represents a vehicle calibration to be activated based on the geographical position of the vehicle.

20. The method of claim 15, where the base calibration includes parameters to adjust emissions of an engine.

\* \* \* \* \*